P. A. BROWN.
ELECTRICALLY OPERATED AUTOMATIC CUT-OUT.
APPLICATION FILED DEC. 20, 1909.
982,346.
Patented Jan. 24, 1911.
3 SHEETS—SHEET 1.
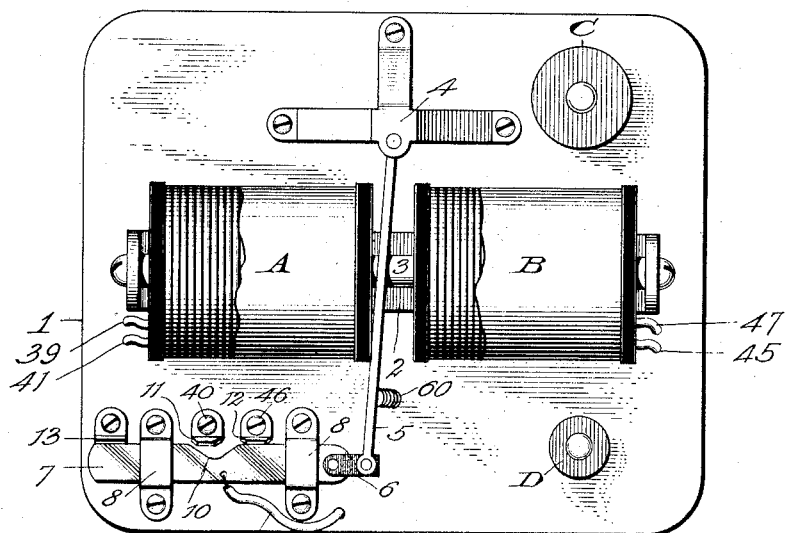
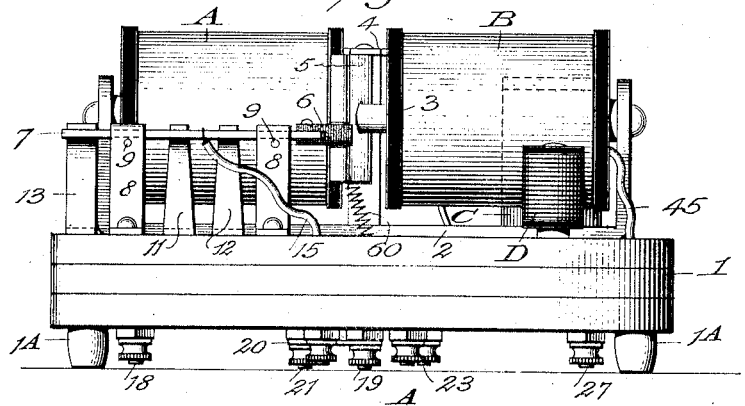
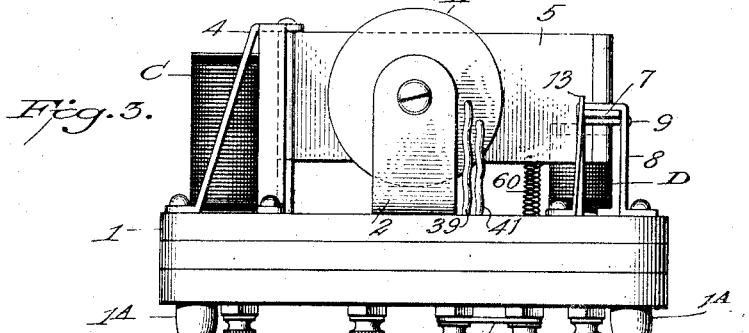
Witnesses:
G. Sargent Elliott
Adella M. Fowle
Inventor.
Peabody A. Brown.
By H. S. Bailey, Attorney.

P. A. BROWN.
ELECTRICALLY OPERATED AUTOMATIC CUT-OUT.
APPLICATION FILED DEC. 20, 1909.
982,346.
Patented Jan. 24, 1911.
3 SHEETS—SHEET 2.
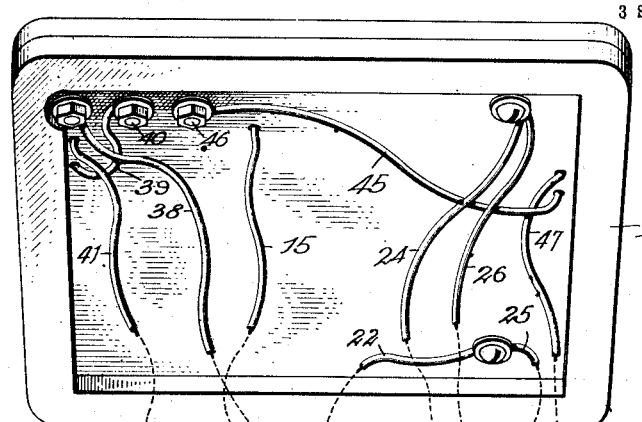
Fig. 4.
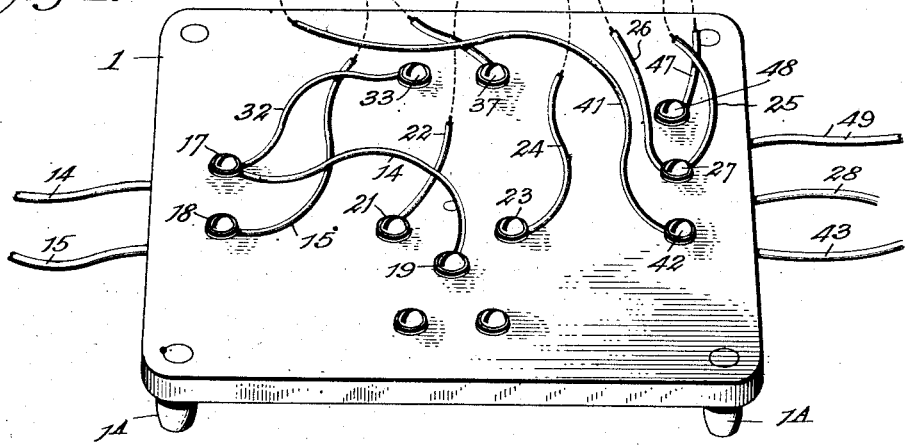
Fig. 6.
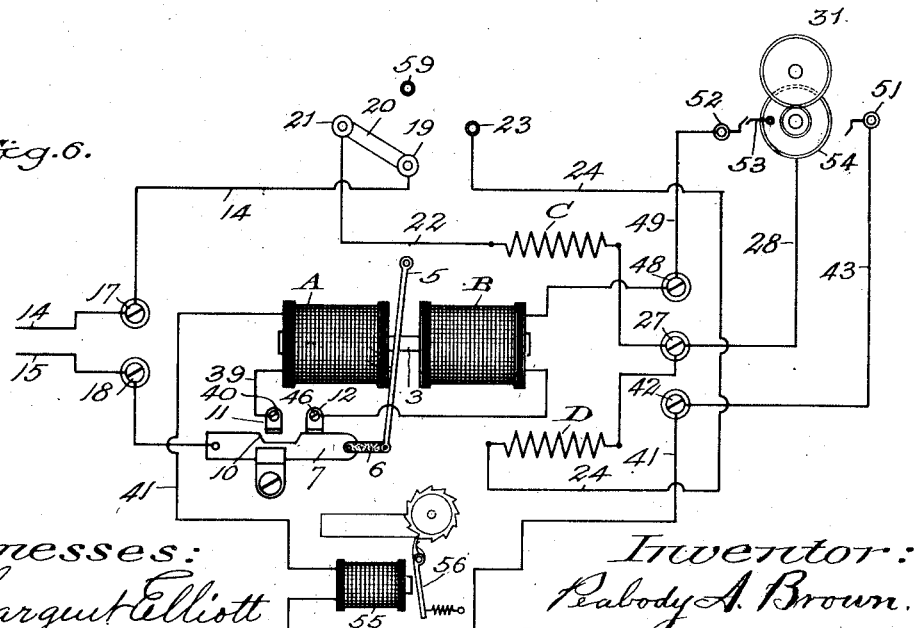
Witnesses:
G. Sargent Elliott
Adella M. Fowle
Inventor:
Peabody A. Brown.
By
H. S. Bailey  Attorney.

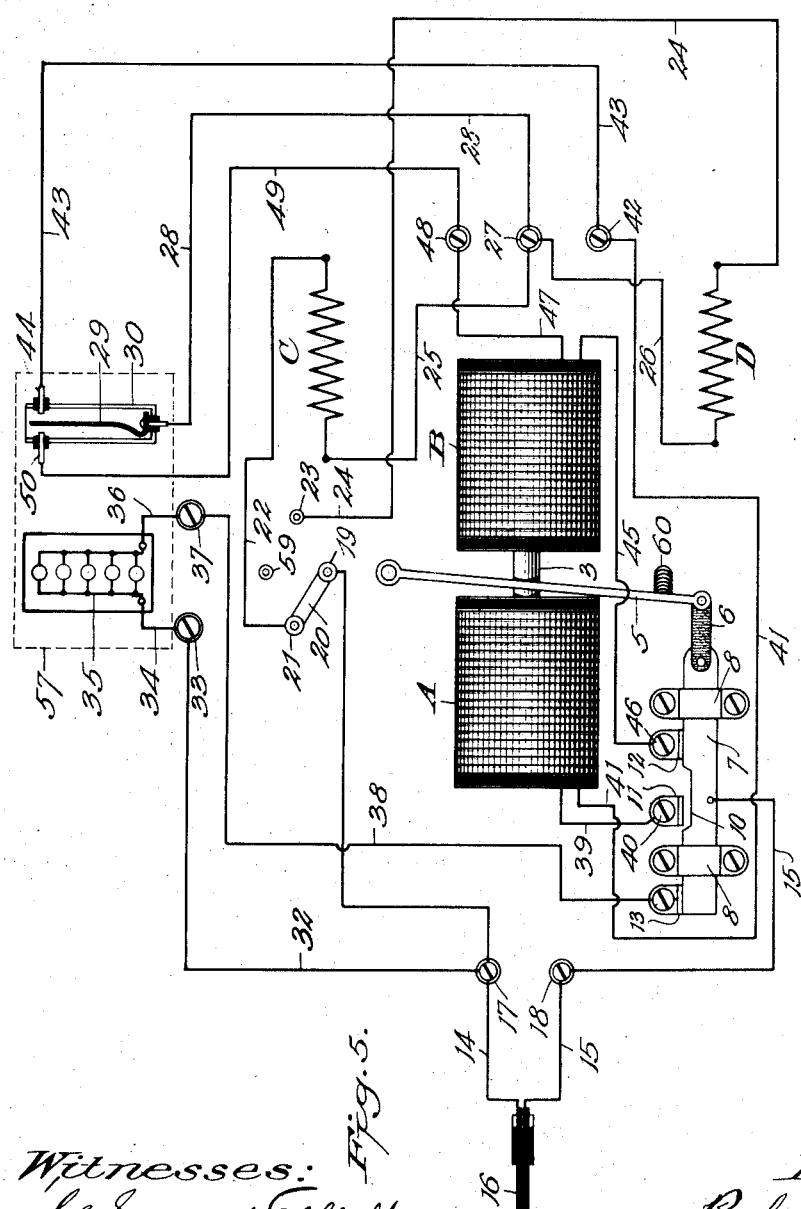

UNITED STATES PATENT OFFICE.

PEABODY A. BROWN, OF DENVER, COLORADO.

ELECTRICALLY-OPERATED AUTOMATIC CUT-OUT.

982,346. Specification of Letters Patent. Patented Jan. 24, 1911.

Application filed December 20, 1909. Serial No. 534,135.

*To all whom it may concern:*

Be it known that I, PEABODY A. BROWN, a citizen of the United States of America, residing at the city and county of Denver and State of Colorado, have invented a new and useful Electrically-Operated Automatic Cut-Out, of which the following is a specification.

This invention relates to improvements in automatic cut-outs for electric circuits.

The object of the invention is to provide a cut-out which is automatically operated by a thermostat, by a clock mechanism, or by any other suitable means, the thermostat being used when the cut-out is employed for regulating the temperature in electrically heated apartments, incubators, etc., where it is desired to maintain an even temperature, while the cut-out is arranged in circuit with clock mechanism when it is desired to effect setting of dating machines and similar devices, where a mechanical operation is to be accomplished at predetermined periods. Further, to provide a cut-out comprising a slide bar connected to an armature, which is alternately attracted by oppositely arranged magnets, said slide bar being in engagement with contacts in circuit with said magnets, whereby when a circuit is closed through one magnet by means of the thermostat or clock mechanism, as the case may be, the armature is attracted to said magnet, thereby instantaneously breaking the circuit by moving the bar out of engagement with the contact in circuit with said magnet and bringing it in engagement with the contact in circuit with the opposite magnet, thus maintaining an open circuit until the thermostat or clock mechanism closes the circuit through the said opposite magnet, thus preventing the burning out of the coils by a continuous closed circuit, as well as the burning out of the clock terminal contacts when clock mechanism is employed, due to the elongation of the arc as the contacts engage and separate, these objections being inevitable when a closed circuit is maintained.

The above objects are accomplished by the mechanism illustrated in the accompanying drawings, in which:

Figure 1 is a plan view of the improved cut-out and operating magnets therefor. Fig. 2 is a front view of the same. Fig. 3 is an end view thereof. Fig. 4 is a perspective view showing the parts of the hollow platform upon which the cut-out is mounted, separated to disclose the various binding screws and wires connecting the cut-out mechanism therewith. Fig. 5 is a view in diagram showing the cut-out in circuit with a heating device and thermostat; and Fig. 6 is a view in diagram showing the cut-out in circuit with clock mechanism, which is designed to close a circuit through the magnets at predetermined periods.

Referring to the accompanying drawings, the numeral 1 indicates a base or platform, which is made of suitable non-conducting material, as wood, slate, etc., and is supported upon short legs 1^A. The platform is rectangular in outline and is hollow in order to inclose the various wires which connect the cut-out mechanism with binding screws, which extend through the bottom of the platform and are provided with binding nuts for attaching the wires leading from the platform, as will be hereinafter fully set forth.

Upon the platform is secured a bracket 2, consisting of a metal bar, the ends of which are bent up at right angles to said bar, and upon these upright ends are secured a pair of magnet coils A and B, a suitable space being left between their inner ends, which are connected by an axial bar 3, as shown. A bracket 4 is secured to the platform, on one side of the magnets, and an armature 5 is pivotally connected at one end to the bracket and to the platform, the pivotal point being on a line midway between the two magnets. The armature is provided with an aperture, through which the bar 3 passes. To the outer end of the armature is pivotally attached a link or arm 6, of non-conducting material, preferably fiber, and to the opposite end of this link is pivotally attached a slide bar 7, which will henceforth be referred to as the cut-out bar. This bar is supported by a pair of standards 8, which are secured to the platform and by pins 9, which pass through the standards beneath the bar 7. The inner edge of the cut-out bar is provided with a recess 10, into which the upper ends of one or the other of a pair of resilient contacts 11 and 12 are adapted to extend, according to the position of the bar, the contact 11 being in said recess 10 and out of contact with the cut-out bar, when the armature has been attracted by the magnet A, while the contact 12 extends into the said recess, when the armature has been attracted by the magnet B. A third contact 13 is adapted to engage the edge of the cut-out bar simultaneously with the engagement therewith of the contact 12, and to be out of engagement with said bar when the said contact 12 is in the recess 10 and consequently out of engagement with the bar. The contact 13 is in circuit with an electric heating device of any suitable character and with the cut-out bar, while the contacts 11 and 12 are connected with the magnets A and B respectively, whereby a branch circuit connecting the said heating device with a main circuit is alternately opened and closed for indefinite periods, as will be fully shown hereinafter.

A resistance coil C is secured in a suitable position on the platform, and this coil is wound for 110 volts direct current, or any other required voltage, while a resistance coil D is also secured to the platform and is wound to receive a corresponding number of volts of an alternating current. The main circuit wires 14 and 15 are connected to a suitable plug 16, and extend to binding screws or posts 17 and 18 respectively, which extend through the bottom of the platform. The wire 14 extends from the post 17 to a post 19, which may be connected by a switch bar 20 with either a post 21, which is connected by a wire 22 with the resistance coil C, or with a post 23, connected by a wire 24 with the resistance coil D. The coils C and D are connected by wires 25 and 26 respectively to a post 27, which is also connected by a wire 28 with the arm 29 of a thermostat 30 or with a clock mechanism 31, as the case may be. The main wire 15 extends from the post 18 through an opening in the top of the platform to the cut-out bar 7, to which it is connected. From the post 17 a branch wire 32 extends to a post 33 on the platform, and this post is connected by a wire 34 with an electric heating device of any desired character when the cut-out is used in connection with an automatic temperature regulator. In the present instance, as shown in Fig. 5, the heating device comprises an incandescent lamp circuit, or heat coil, which may be employed for any suitable purpose, such as the heating of an incubator, the energizing of a coil, or other functions. The wire 34 is connected to one terminal of the lamp circuit 35, while a wire 36 extends from the other terminal to a post 37 on the platform, which post 37 is also connected by a wire 38 with the terminal contact 13. Thus, when the cut-out bar 7 is in the position shown in Fig. 5 the circuit including the heater is closed through wires 14, 32, 34, 36 and 38, contact 13, cut-out 7 and wire 15, and when the cut-out bar is shifted to the opposite position the lamp circuit is cut out from the main circuit, and consequently opened. One terminal 39 of the winding of the magnet A passes through an opening in the platform and connects with a binding screw 40, which secures the contact 11 to the said platform, while the other terminal 41 of the said magnet winding extends through an opening in the top of the platform and connects with a post 42 which extends through the bottom of the platform, and which is also connected by a wire 43 with one of the contacts 44 of the thermostat 30. One of the terminals 45 of the winding of the magnet B passes through an opening in the top of the platform and connects with a binding screw 46 which secures the contact 12 to the platform, while the other terminal 47 of the said winding connects with a post 48 which extends through the bottom of the platform and which is also connected by a wire 49 with the other contact 50 of the thermostat.

When the cut-out is operated by a clock mechanism, as shown in Fig. 6, the wires 43 and 49 are connected with terminal contacts 51 and 52 respectively, which are designed to be engaged by a contact 53 upon one of the wheels 54 of the clock mechanism, and when thus operated a magnet 55 is connected with either of the wires 41 or 49, so as to be in circuit with either the magnet A or B, and the armature 56 of the said magnet 55 may be arranged to effect a required mechanical action, such as the setting of a dating or numbering machine, or any other similar operation, where it is required to accomplish a mechanical operation at predetermined periods, the length of the period being determined by the revolution of the wheel 54, which may be geared to make a revolution in any required time.

In operation, assuming that the cut-out is used in connection with some form of electrical heating device, the parts are arranged as shown in Fig. 1, and the wires connecting the several coils and other parts of the cut-out with the various binding posts are all inclosed within the hollow platform. The wires leading from the platform are the feed wires 14 and 15, which extend from the posts 17 and 18 respectively to the plug 16, the wires 34 and 36, which extend from the posts 33 and 37 respectively to the heating device, which, in the present instance, is an incandescent lamp circuit, and the wires 28, 43 and 49, which extend from the posts 27, 42 and 48 respectively to the thermostat. The lamp circuit and thermostat are located within a dotted inclosure 57, which may represent an incubator and the thermostat is arranged to maintain any required temperature, say eighty degrees. If the heater is to be operated by a direct current, the switch 20, connecting with the feed wire 14 is moved to engage the post 21, which is in circuit with the resistance coil C, and if an alternating current is employed the switch is turned to engage the post 23, which is in circuit with the resistance coil D.

In Fig. 5 the heater is shown as operating under a direct current, and the branch circuit connected with the heater is closed by engagement of the contact 13 with the cut-out bar 7, while the circuit through each magnet is open. As the temperature in the incubator rises, the thermostat arm 29 moves toward the contact 50, and if the temperature rises above eighty degrees the arm engages the contact 50 and a circuit is closed through the magnet B by wires 14, 22, 25 and 28 and thermostat arm, and thence by contact 50 and wires 49, 47 and 45 to contact 12 and through cut-out bar 7 to wire 15, thus completing the circuit. The armature 5 is thereby attracted by the magnet B, and the cut-out bar 7 is thus shifted to the opposite position, thereby cutting out contacts 12 and 13, the former being now within the recess 10 of the bar, while the end of the bar is out of engagement with the contact 13. The branch circuit connected with the heater, as well as the circuit through the magnet B, are thus instantaneously broken, and while the contact 11 connected with the magnet A is now in engagement with the bar 7, the circuit through the said magnet A is also open and remains so until the temperature in the incubator falls sufficiently to cause the thermostat arm to engage the opposite contact 44, when a circuit is closed through the magnet A by wires 14, 22, 25, 28, arm 29, thermostat contact 44 and wires 43, 41, 39, contact 11, bar 7 and wire 15. The armature 5 is thus again attracted by the magnet A, and the lamp circuit is again closed by engagement of the bar 7 with contact 13, and remains closed until the temperature rises sufficiently to cause the thermostat arm to engage the contact 50, when the lamp circuit is again cut out, as before described.

It will be noted that as each magnet attracts the armature the circuit through that magnet is instantaneously broken by the cutting out of the contact connecting said magnet with the cut-out bar, even though the thermostat arm may remain for a period in engagement with the contact by which the circuit was closed. The circuit through the other magnet is also open and remains so until the thermostat arm moves to the opposite contact. It will thus be apparent that a closed circuit through either magnet is maintained only for an instant, or while the armature is moving from one magnet to the other, and that at all other times these circuits are open, thus preventing the burning out of the coils, which inevitably occurs, when a closed circuit is maintained.

The improved cut-out may be employed to effect automatically a variety of mechanical operations, either by the use of a thermostat or by clock mechanism, and it may also be manually operated by means of a push button. The breaking of the circuits through each magnet simultaneously with the attraction of the armature by said magnet not only saves the magnets and resistance coils from burning out but when the cut-out is controlled by clock mechanism the instantaneous breaking of the circuit before mentioned prevents the burning out of the contacts connected with the clock mechanism by the elimination of the arc, which, with a closed circuit, is formed as the moving contact leaves the fixed contact.

In order to prevent the armature from rebounding when attracted by a magnet, a coiled spring 60 is secured at one end to the platform on a line centrally between the inner ends of the two magnets, while its opposite end is secured to the lower edge of the armature. When the armature is in a neutral position, midway between the two magnets, this spring is under compression and as the armature is moved to either side of the neutral line, the spring expands and not only assists in throwing the armature but prevents it from rebounding, as before stated.

Having described the invention, what I claim as new and desire to secure by Letters Patent is:

1. In an automatic cut-out as specified, a slide bar, a circuit closer and wires connecting said bar and closer with a source of power; a pair of magnets; an armature adapted to be alternately attracted by said magnets and a non-conducting link connecting the armature with the slide bar; contacts in circuit with the magnets and adapted to be engaged in alternate order by the slide bar; contacts in circuit with the magnets and adapted to be engaged in alternate order by the circuit closer, and means for preventing the recoil of the armature.

2. In an automatic cut-out as specified, a slide bar, a circuit closer and line wires connecting the bar and closer with a source of power; a pair of magnets; an armature adapted to be alternately attracted by said magnets and means connecting the armature and slide bar; contacts in circuit with the magnets and adapted to be engaged in alternate order by the closer; contacts in circuit with the magnets and adapted to be engaged in alternate order by the slide bar; a contact in engagement with the slide bar at one extremity of its movement and branch circuit wires connected with said contact and with one of the line wires.

3. In an automatic cut-out as specified, a slide bar having a recess in one edge and an automatically operating circuit closer, both in circuit with a source of electric power; a pair of magnets; a pivotally mounted armature adapted to be alternately attracted by said magnets and connected at one end with the slide bar; oppositely arranged contacts in circuit with the magnets and adapted to be engaged by the circuit closer in alternate order, a pair of contacts in circuit with the magnets and positioned to be engaged by the slide bar and cut-out of circuit in alternate order by means of the recess in said bar; a contact in engagement with said bar when the same is at the limit of its movement in one direction, and a branch circuit in connection with said latter contact and the source of power, which is alternately closed and opened by the movement of the slide bar.

4. In an automatic cut-out as specified, a slide bar having a recess in one edge, an automatically operating circuit closer and feed wires connecting them with a source of power; a pair of magnets; an armature adapted to be attracted by said magnets in alternate order and connected at one end to said bar; oppositely arranged contacts in circuit with the magnets and adapted to be engaged by the circuit closer in alternate order; contacts in circuit with the magnet and adapted to be alternately engaged by the edge of said slide bar, said contacts being so arranged relatively to the recess in said bar that when the armature is attracted by the closing of a circuit through one of said magnets and the contact engaging the bar, the shifting of said bar brings said contact within the said recess and breaks the circuit through said magnet; a third contact in engagement with the bar when the same is at the limit of its movement in one direction and a branch circuit connected with the last mentioned contact and with one of the feed wires which is opened or closed by the movement of the slide bar.

5. In an automatic cut-out as specified, a slide bar; contacts adapted to be engaged independently by said slide bar; magnets in circuit with said contacts; an armature connected at one end with the slide bar and adapted to be alternately attracted by said magnets; means for automatically closing a circuit through said magnets in alternate order and through said slide bar; a third contact adapted to be engaged by said slide bar at each alternate movement of the same and a branch circuit connected with said third contact which is opened and closed by the movement of said bar.

6. In an automatic cut-out as specified, the combination with a platform, of brackets mounted thereon; a bar slidably mounted in said brackets; magnets mounted on said platform; an armature pivotally mounted on said platform between said magnets and adapted to be attracted by them in alternate order, and insulating means connecting its free end with the slide bar; feed wire binding posts on the platform, and wires connecting them with a switch and with the slide bar; binding posts in the path of said switch; resistance coils, one terminal of which is connected to one of the switch posts, while their opposite terminals are connected to a common binding post; an automatically operating circuit closer; and a wire leading from said common post to said circuit closer; posts in circuit with the magnets; contacts connected with said posts and adapted to be alternately engaged by said circuit closer; contacts in circuit with the magnets and adapted to be independently engaged by the slide bar in alternate order; a third contact adapted to be engaged by the slide bar at each alternate movement, and branch wires connected with said last mentioned contact and with one of the feed wires to form a branch circuit which is opened and closed by the alternate movements of said slide bar.

In testimony whereof I affix my signature in presence of two witnesses.

PEABODY A. BROWN.

Witnesses:
G. SARGENT ELLIOTT,
ADELLA M. FOWLE.